United States Patent
Little et al.

(10) Patent No.: US 6,204,846 B1
(45) Date of Patent: *Mar. 20, 2001

(54) DATA SET USER INTERFACE CONTROL FOR USE IN ACCESSING INFORMATION IN A COMPUTER

(75) Inventors: Alex Dudley Little, Raleigh, NC (US); Anthony Edward Martinez, Austin, TX (US); Michael David Rahn, Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/250,448

(22) Filed: Feb. 16, 1999

(51) Int. Cl.$^7$ ............................................. G06F 3/14
(52) U.S. Cl. ........................ 345/341; 345/973; 345/974
(58) Field of Search .................... 345/341, 339, 345/347, 348, 973, 974, 975, 123, 124, 125, 336, 338, 335; 707/1; 709/203, 217

(56) References Cited

U.S. PATENT DOCUMENTS

| | | | |
|---|---|---|---|
| 4,831,556 | * 5/1989 | Oono | 345/341 |
| 5,075,673 | 12/1991 | Yanker | 345/163 |
| 5,122,785 | 6/1992 | Cooper | 345/163 |
| 5,196,838 | 3/1993 | Meier et al. | 345/118 |
| 5,202,961 | 4/1993 | Mills et al. | 345/328 |
| 5,265,246 | * 11/1993 | Li et al. | 707/4 |
| 5,313,229 | 5/1994 | Gilligan et al. | 345/157 |
| 5,333,247 | * 7/1994 | Gest et al. | 345/438 |
| 5,339,391 | 8/1994 | Wroblewski et al. | 345/163 |
| 5,371,846 | 12/1994 | Bates | 345/341 |
| 5,374,942 | 12/1994 | Gilligan et al. | 345/157 |
| 5,418,549 | * 5/1995 | Anderson et al. | 345/145 |
| 5,473,344 | 12/1995 | Bacon et al. | 345/163 |
| 5,491,781 | * 2/1996 | Gasperina | 345/341 |
| 5,493,566 | 2/1996 | Kwatinetz | 345/341 |
| 5,506,951 | 4/1996 | Ishikawa | 345/341 |
| 5,526,480 | 6/1996 | Gibson | 345/302 |
| 5,528,260 | 6/1996 | Kent | 345/123 |
| 5,530,455 | 6/1996 | Gillick et al. | 345/163 |
| 5,550,969 | 8/1996 | Torres et al. | 345/348 |
| 5,553,225 | 9/1996 | Perry | 345/341 |
| 5,581,275 | * 12/1996 | Glei et al. | 345/123 |
| 5,633,657 | 5/1997 | Falcón | 345/145 |
| 5,680,561 | * 10/1997 | Amro et al. | 345/341 |
| 5,838,320 | * 11/1998 | Matthews, III et al. | 345/341 |
| 5,867,678 | * 2/1999 | Amro et al. | 345/347 |
| 5,874,961 | * 2/1999 | Bates et al. | 345/341 |

OTHER PUBLICATIONS

"Class specification for java.awt.Scrollbar", *Java Developmemt Kit 1.2*, Sun Microsystems (1997), 14 pages.

(List continued on next page.)

*Primary Examiner*—Crescelle N. dela Torre
(74) *Attorney, Agent, or Firm*—Wood, Herron & Evans, L.L.P.

(57) ABSTRACT

An apparatus, program product, user interface control and method indicate, on a data set user interface control, the size of a subset of data relative to an overall data set accessible by the control. The data set user interface control may be implemented in much the same manner as a scroll bar, including a slider control that can be manipulated along a scroll region of the scroll bar to adjust the parameters of the subset of data accessible through the window. Further, the length of the slider may be set relative to that of the scroll region to represent the size of the current subset relative to the overall data set. The length of the slider may also be manipulated by a user to adjust the size of the current subset. While a data set user interface control may be implemented in a wide variety of additional environments, one particularly suitable use is in a client-server environment where a data set is retrieved in the form of subsets from an external information source accessible via a server computer.

38 Claims, 6 Drawing Sheets

OTHER PUBLICATIONS

"New Common User Access Control: Pushpad for Greater Mouse Productivity", *IBM® Technical Disclosure Bulletin*, vol. 37, No. 08, (Aug. 1994), pp. 497–499.

Speed–Sensitive Scroll Widgets, *IBM® Technical Disclosure Bulletin*, vol. 38, No. 01, (Jan. 1995,) pp. 483–484.

"Part 1 Your First Day at the Office", *Getting Results with Microsoft® Office 97 Real World Solutions for the Work You Do,* Microsoft Corporation, (1995–96), pp. 62–65, 74–75, and 78–80.

U.S. Department of Commerce Patent and Trademark Office, *Automated Patent System (APS) Workstation Quick Reference Guide for the Third Generation Workstation (3WGS),* APS–TR–TRG–30–05.03, (Mar. 27, 1996), Sections 1,2.

"Delrina 7.0 WinFax Pro Getting Started Guide", *Getting Started Basics,* (Apr. 1996), p. 5–11.

"Screenshot of Cassis Patents BIB dataware software", United States Patent and Trademark Office (Aug. 1998), 1 page.

* cited by examiner

DATA SET USER INTERFACE CONTROL FOR USE IN ACCESSING INFORMATION IN A COMPUTER

FIELD OF THE INVENTION

The invention is generally related to computers and computer software. More specifically, the invention is generally related to accessing information with a user interface control displayed on a computer display.

BACKGROUND OF THE INVENTION

Many computer systems utilize graphical user interfaces (GUI's) to permit user interaction with data stored in such systems. In a GUI environment, users are typically able to interact with a computer system through intuitive operations such as "pointing and clicking" on graphical user interface controls with a pointer controlled by a mouse or other user interface device. Data is often presented to a user in a GUI environment using a graphical user interface component known as a window. In many computer systems, data to be presented in a window is commonly referred to as a "document".

Similar to a physical window that typically offers a view of only a portion of a person's surroundings, a GUI window typically provides a view of only a portion of the data in a document. Consequently, whenever the amount of data in a document is too great for the entire document to be displayed in a window at the same time, many computer systems rely on graphical user interface controls referred to as scroll bars to permit a user to access different portions of a document.

A scroll bar typically permits a user to scroll in a predetermined direction (i.e., vertically or horizontally) through manipulation of various controls on the scroll bar. For example, many scroll bars include an elongated scroll region, or track, that represents the overall size of the document in the direction of the member. A slider is anchored on the track at the relative position of the portion of the document that is displayed in the window. The slider may be a fixed size, or may have a variable size along the length of the track to represent the relative size of the portion of the document displayed in the window. By depressing a mouse button while the pointer is disposed over the slider, and then moving the pointer along the length of the track while the mouse button is depressed, a user is typically permitted to scroll through the document (an operation known as "dragging" the slider).

A scroll bar may also include a pair of arrow buttons (also known as unit increment and decrement controls), disposed at each end of the track that permit line-by-line scrolling through the document in response to pointing and clicking on the buttons. Moreover, some scroll bars additionally permit a user to scroll screen-by-screen or page-by-page (known as a block increment or decrement) by pointing and clicking directly on the track between the slider and one of the arrow buttons.

In many instances, a conventional scroll bar permits access to an entire set of desired data that a user wishes to view, which often requires that the entire set of data be retrieved into a computer's memory so that the information in the data set is readily available for display as the user scrolls through the window contents. However, in other instances, it may not be desirable to retrieve an entire data set at once, but rather, to retrieve such a data set in pieces.

For example, a number of computer systems rely on a "client-server" model for information retrieval. In a client-server system, information is primarily stored on a relatively large and high performance server computer accessible by multiple users. Each user desiring to access the information on a server does so through his or her client computer, e.g., a personal computer or terminal. Users make requests for information via their client computers, which are transmitted to the server computer for processing. The requested information is then returned to the client computers for display. As an example, many database systems are configured as client-server systems, whereby users pass requests to a server to search for and locate individual "records" of data that match a particular search criteria.

In many client-server systems, a caching mechanism is used to improve usability. Specifically, whenever a client requests a relatively large data set, data is transmitted from the server to the client in "subsets", or chunks of data from the overall data set. Thus, for example, if a user's request results in 10,000 records matching the request, the information might be returned to the client in 1000 record increments that a client could separately request one at a time to permit viewing of the entire data set.

Caching a data set often improves performance since transmitting a large data set all at once to a client over a network ties up server and network resources, and increases the response time back to the client. Caching a data set also decreases the requirements on client computers, since such client computers might otherwise require additional memory and or external storage to store a large data set.

In a GUI-based client, subsets of data from a desired data set are often displayed in a window. Moreover, whenever the display area required to display a subset of data exceeds the display area allocated to a window, a scroll bar is provided to permit a user to scroll within the subset. Selection of different subsets of data, however, is handled through a separate user interface mechanism—typically a series of data set controls such as buttons that a user can select to retrieve the previous or next subsets in a desired data set (e.g., "show previous 1000 records", or "show next 1000 records). Controls may also be provided to permit a user to go directly to first or last subsets. Typically, the subset size is fixed, or at the most, buried in configuration settings that are not readily accessible by the user.

A number of drawbacks exist with respect to conventional mechanisms for accessing subsets of data from a data set. First, a user often has little or no flexibility in varying the size and/or specific range of data to view from a data set. Thus, for example, a user is often not permitted to specify retrieval of just records 1725 to 1775 of 10,000 with a conventional user interface mechanism. Moreover, a user often is presented with little feedback that allows the user to determine where in the overall data set the current subset of data fits, or to determine what percentage of the overall data set is currently being accessed through the window.

Of particular concern is that, without the ability to readily configure the size of a subset, a user is limited to the size dictated by the server, which may limit the user's flexibility. For example, if a 1000 record subset size results in subsets being returned that exceed the storage capacity of a client, that client may not be able to store an entire subset, or may perform slowly. Also, if the amount of data in a particular subset is relatively large, the amount of information displayed in a window may be relatively great, requiring the user to scroll extensively through the window to locate specific information. Performance of the scroll bar for the window in such an instance may also be degraded because the scroll bar may become too sensitive and make it difficult for a user to scroll to a precise location in the window.

Therefore, a significant need exists in the art for an improved manner of improving access to information in a graphical user interface environment, particularly in client-server computer systems and the like.

SUMMARY OF THE INVENTION

The invention addresses these and other problems associated with the prior art by providing an apparatus, program product, and method that indicate, on a data set user interface control, the size of a subset of data relative to an overall data set accessible by the control. As such, a user is provided with readily-accessible feedback concerning what is in fact accessible in the window.

With certain implementations of the invention, a data set user interface control is implemented in much the same manner as a scroll bar, including a slider control that can be manipulated along a scroll region of the scroll bar to adjust the parameters of the subset of data accessible through the window. Further, in such implementations, the length of the slider is set relative to that of the scroll region to represent the size of the current subset relative to the overall data set. It may also be desirable to permit the length of the slider to be manipulated by the user to adjust the size of the current subset.

While a data set user interface control may be implemented independently of any window scroll bar, when a data set user interface control is used in conjunction with a window scroll bar, a user is provided with a great deal of control over what information is accessed from a data set. Specifically, the data set user interface control may be used to control what portion of the overall data set is allocated to a window, while the window scroll bar may be used to scroll through the data allocated to the window. Thus, more complete control over information access is achieved.

Moreover, while a data set user interface control may be implemented in a wide variety of additional environments, one particularly suitable use is in a client-server environment where a data set is retrieved in the form of subsets from an external information source accessible via a server computer. Thus, for example, rather than being limited to retrieval of fixed numbers of records matching predefined boundaries, a user may be permitted to select any or all of the size, the starting record and the ending record for a particular subset of data to display in a window, offering greater flexibility and increased productivity over conventional designs.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments described hereinafter utilize a unique data set user interface control that indicates the size of a subset of data relative to an overall data set. The subset of data generally represents that portion of the overall data set that is allocated to a particular window with which the data set user interface control is associated. A subset of data is allocated to a window whenever all of the information from the subset of data may be viewed in the window—that is, when all the information in the subset of data forms at least a portion of the contents of the window. It will be recognized, however, that data that forms the content of a window may or may not be actually displayed in the window at any given time, since the viewable area of a window often is capable of displaying only a portion of the window contents. Typically, the entirety of window contents may be accessed, however, via manipulation of one or more conventional scroll bars associated with the window.

A data set may represent practically any information space that is accessible by a computer (e.g., a group or collection of data records or objects), and a subset may represent practically any segment or portion of such an information space, whether or not contiguous. Information from a data set may be stored locally on a user's computer, or may be accessible via an external information source such as a server computer or other external storage device coupled to a user's computer via a network or other communications interface.

The discussion hereinafter will focus on one particular implementation of the invention in a client-server environment, in which a data set represents a plurality of records, e.g., as determined in response to a request or query from a client. A subset therefore represents a subset of the plurality of records. The invention is not limited, however, to use in a client-server environment, or to use with a data set that is organized into records. Specifically, other environments and data organizations may be used in the alternative.

Hardware and Software Environment

Figure 1:
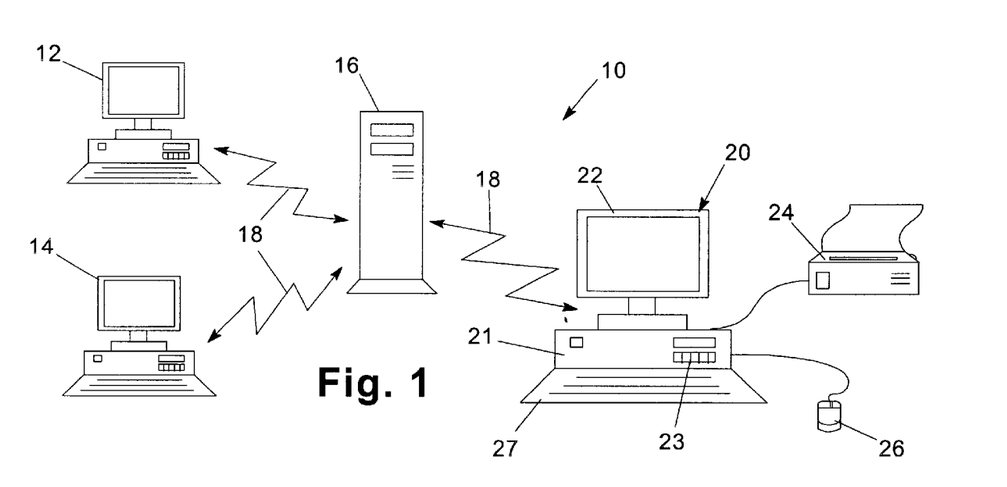
FIG. 1 is a block diagram of a networked computer system consistent with the invention.

Turning to the Drawings, wherein like numbers denote like parts throughout the several views, FIG. 1 illustrates a computer system 10 consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured, albeit typically with greater processing performance and storage capacity, as is well known in the art.

Figure 2:
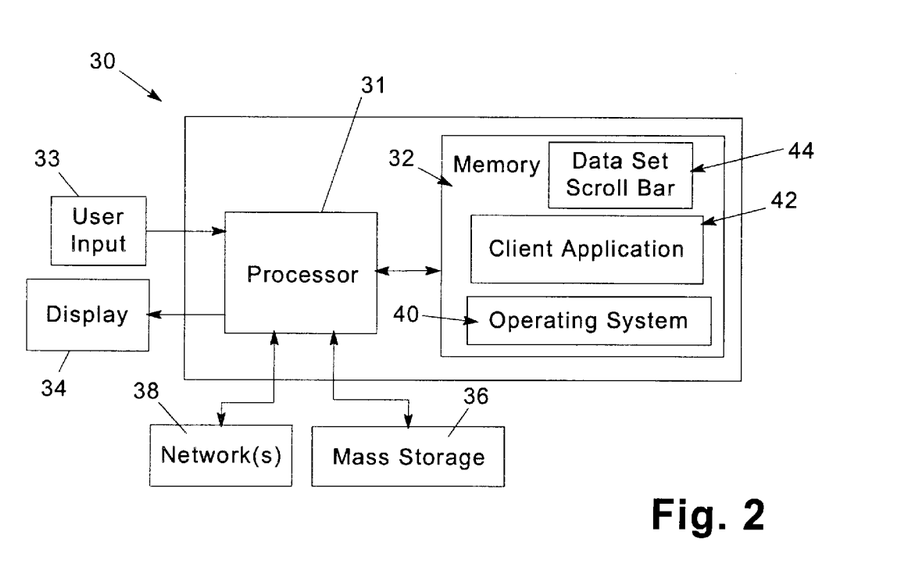
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 14 and 20 of FIG. 1), a server computer (e.g., similar to server 16 of FIG. 1), a portable computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, direct user input and output may not be supported by the computer.

For additional storage, computer 30 may also include one or more mass storage devices 36, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38 as is well known in the art.

Computer 30 operates under the control of an operating system 40, and executes or otherwise relies upon various computer software applications, components, programs, objects, modules, data structures, etc. (e.g., client application 42 and data set scroll bar 44, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Information Access with a Data Set User Interface Control

Figures 3, 4:
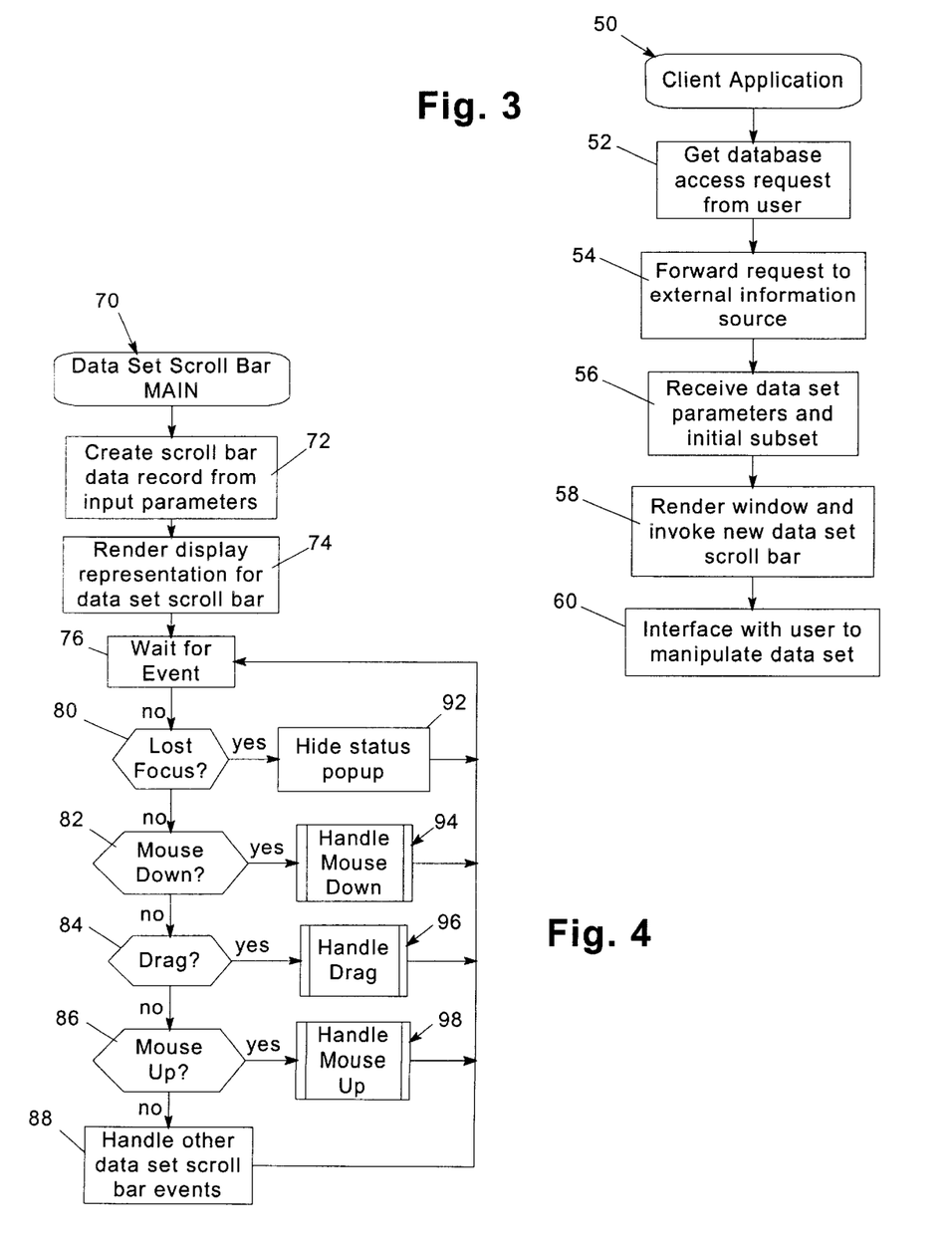
FIG. 3 is a flowchart illustrating the program flow of an exemplary sequence of operations performed by the client application of FIG. 2.
FIG. 4 is a flowchart illustrating the program flow of a main routine for the data set scroll bar of FIG. 2.

As discussed above, the embodiment described hereinafter focuses on the use of a data set user interface control in a client-server environment, where a user typically makes requests through a client computer for the retrieval of data via a server computer. One manner in which such a control may be initially invoked is illustrated in FIG. 3, where a sequence of operations 50 is illustrated for client application 42 of FIG. 2. In this exemplary sequence of operations, a user requests information from a database controlled by a server computer, e.g., via a SQL or other suitable database query, and the requested information is returned to the user by the server.

Starting at block 52, a user inputs to the client computer a database request. Such a request may be manually entered, e.g,. via a GUI environment, or may be automatically performed by an application running on the client. In block 54, the request is forwarded to the server computer (representing an external information source), which handles the request in a manner well known in the art. Typically, this includes generating a data set of records that match the request, and then transmitting to the client computer the records from at least a subset of the data set. In addition, an indication of what records are being transmitted, as well as the total number of records, is included with the subset transmission. Thus, as shown in block 56, the client application receives the initial subset as well as the data set parameters, e.g., the total number of records and the starting and ending records in the transmitted subset.

Next, in block 58 the client application renders a window on the computer display for the client, and invokes a data set user interface control object, referred to hereinafter as a data set scroll bar. Next, as shown in block 60, the client application interfaces with the user to manipulate the data set, e.g., to request new subsets of data from the server, to initiate new requests to the server, to scroll the result window, etc. It is during this latter operation that events are typically passed to the data set scroll bar and other user interface controls to manipulate the data set in the manner disclosed herein.

A data set user interface control in the illustrated embodiment is implemented as a software object, including both the data specifying the parameters of the control, as well as the routines or methods necessary to manipulate such parameters. A data set user interface control is also considered to include a display representation that represents the viewable graphical and/or textual images displayed on a computer display and through which a user interacts with the control.

The display representation of a data set user interface control typically includes one or more display elements, which may optionally be implemented as separate user interface control objects. Whether or not such display elements are considered to be within the same object or separate objects, implementation of these display elements in an object-oriented environment would be well within the abilities of the ordinary artisan, having the benefit of the disclosure herein.

For example, in the embodiment described hereinafter, a data set user interface control is implemented using a scroll bar-like display representation, including a scroll bar display element, a slider display element, and optionally one or more button display elements. However, other display representations may be used in the alternative, so the invention is not limited to the scroll bar-like representation described hereinafter.

Figure 5:
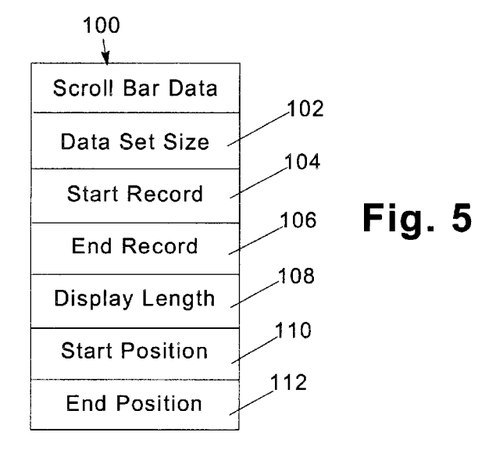
FIG. 5 is a block diagram of a scroll bar data record used by the data set scroll bar of FIG. 2.

FIG. 4 illustrates a main routine 70 for a data set scroll bar consistent with the invention. Routine 70 is typically called during invocation of the data set scroll bar object, and is provided with input parameters specifying the display characteristics for the scroll bar. Routine 70 begins in block 72 by creating a scroll bar data record based upon these input parameters. As shown in FIG. 5, for example, a scroll bar data record 100 may include various data fields containing information required to implement the scroll bar. For example, scroll bar data record 100 includes a data set size field 102 indicating the overall size of the data set (in records). In addition, a start record and an end record, representing the extent of the current subset to be displayed in the window, are stored in fields 104, 106. Field 108 includes a display length parameter, typically indicating in pixels the overall length of a scroll region for the scroll bar, representing the actual dimensions of the region when displayed in the associated window. In addition, fields 110, 112 respectively store start and end positions for the slider control that is displayed on the scroll bar. It should be noted that the size of the subset, as well as the size of the slider, may be derived using the start and end records, and the start and end positions, respectively. In the alternative, the size parameters may be stored directly within the scroll bar data record if desired. Moreover, it should also be appreciated that other data structures may be used to store the scroll bar parameters from record 100.

Returning to FIG. 4, once a scroll bar data record has been created, a display representation for the data set scroll bar is rendered in block 74.

Figure 6:
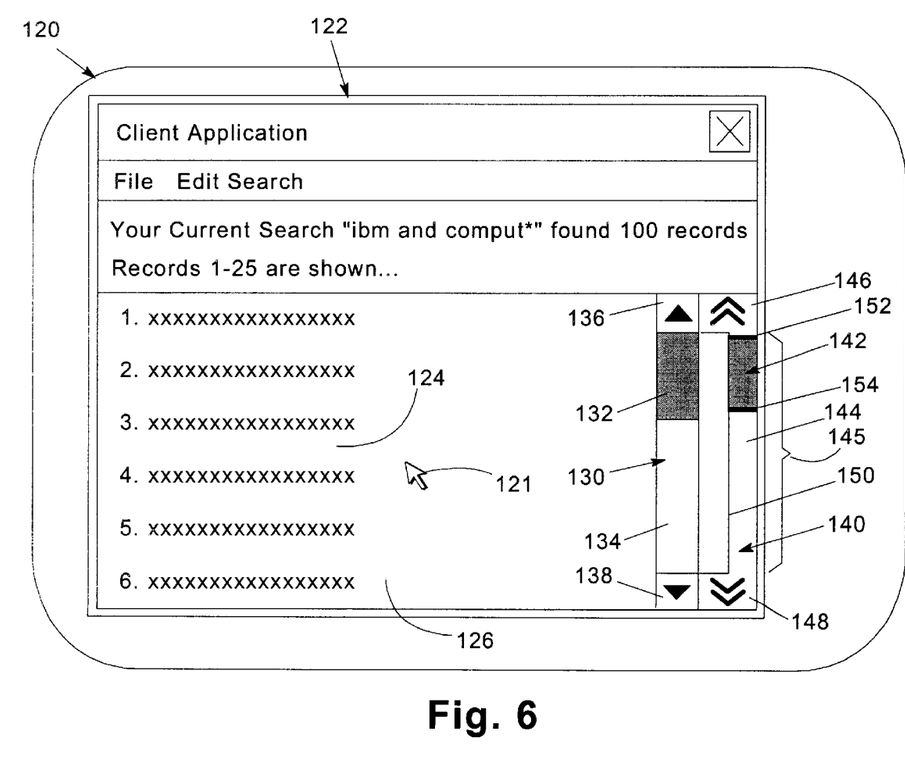
FIG. 6 is a block diagram of an exemplary computer display illustrating a client application window and an exemplary display representation of the data set scroll bar of FIG. 2.

As shown in FIG. 6, for example, a computer display 120 has displayed therein a window 122 for a client application. User interface is performed via a user-controlled pointer 121. A subset of data 124 is displayed within a display region 126 of window 122. A conventional window scroll bar 130 is illustrated, including a slider 132 having a size and position representative of the displayed portion of the contents of the window, where the contents are represented by the subset of data from the overall data set. Also shown on scroll bar 130 is the scroll region 134 representing the relative size of the contents of the window, as well as up and down buttons 136, 138 through which a user may scroll through the contents of the window line-by-line. It should also be appreciated that a user pointing and clicking on the scroll bar region 134 with pointer 121 will typically result in a block-type scroll to scroll by screen-by-screen through the window contents, as is well known in the art.

A display representation 140 of a data set scroll bar consistent with the invention includes a slider control 142 which is slidable along a scroll region 144. The scroll region 144 has a length, illustrated at 145, which represents the overall size of the data set. The size of the slider control 142 is sized in relation to this overall size of the scroll region to represent the relative size of the subset compared to the overall data set. A pair of up and down buttons 146, 148 are user selectable to adjust the portion of the data set that forms the window contents, typically by retrieving a new subset of data, which may or may not include information from the previously-displayed subset of data. Put another way, two subsets can overlap in the overall information space and still be considered distinct subsets.

Display representation 140 also includes a graphical bracket 150 that visually "brackets" window scroll bar 130 to reinforce the notion that both slider control 142 of display representation 140 and scroll region 134 of window scroll bar 130 represent the same portion of the information space defined by the current subset. Moreover, slider control 142 includes a pair of slider resize controls 152, 154 that are used to resize slider control 142 through user manipulation thereof, for the purpose of adjusting the size of the subset forming the contents of the window.

Returning to FIG. 4, once the display representation of the data set scroll bar is rendered on the computer display, control passes to block 76 to initiate an event-driven loop that waits for events in block 76, and then attempts to detect and handle those events in blocks 80–88. Blocks 80–86 represent several events that are relevant to manipulating a data set in the manner disclosed herein. Block 88 represents additional events which may be passed to the data set scroll bar, but which are typically handled in a conventional manner to perform additional functions for the scroll bar.

Figure 7:
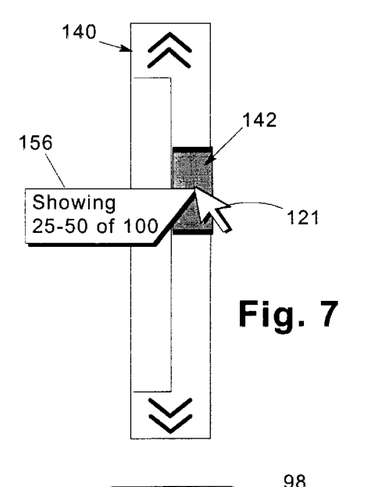
FIG. 7 is a block diagram of the data set scroll bar display representation of FIG. 6, after initiation of a mouse drag operation while the pointer is disposed over the resize control.
Figure 8:
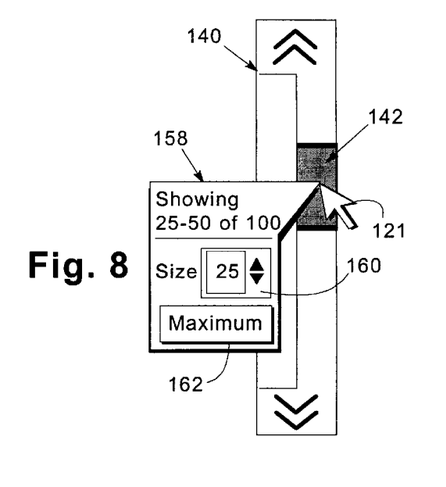
FIG. 8 is a block diagram of the data set scroll bar display representation of FIG. 6, after a click operation on the slide control.

One event handled by the scroll bar is a lost focus event, which is detected at block 80, and is handled in block 92 by hiding any status popup. As will be discussed in greater detail below, one or more different status popup windows (e.g., as shown in FIGS. 7 and 8) may be displayed during user interaction with a data set scroll bar. A lost focus event occurs whenever a user activates another displayed user interface control, e.g., by pointing and clicking outside of the active display region of the data set scroll bar. As such, it is desirable to remove any displayed popup if such an activity occurs.

For example, FIG. 7 illustrates a representative small, or condensed popup window 156 that may be displayed in response to initiation of a drag event while pointer 121 is disposed over slider control 142 of display representation 140. Given that the size of the slider may not be manipulated in such an instance, only the starting and ending records of the subset, as well as the overall data set size in records, need be shown in the popup.

FIG. 8, in contrast, illustrates an expanded popup 158, including a size control 160 and a maximum button 162, in addition to the aforementioned status information in small popup 156. The size control may be implemented, for example, as an edit box or a combo box, which enables a user to either type in a number or utilize a pair of arrow buttons to adjust the size of the slider control. The maximum button 162 may be selected by a user to set the size to a maximum subset size, if such exists. As will be discussed in greater detail below, an expanded popup is typically displayed in two situations. First, whenever a user points and clicks on the slider control without moving the pointer (i.e., to generate mouse down and mouse up events without an intervening mouse drag event), the popup may be displayed in a fixed location to permit user interaction with the size control and maximum button. Second, an expanded popup may be displayed whenever a user initiates a drag operation on a slider resize control.

A popup may display other information to a user consistent with the invention, e.g., edit or combo boxes for controlling the starting and ending records, buttons for going directly to the top or bottom of the data set, etc. Also, a popup may be displayed in other situations. For example, it may be desirable to display a popup whenever a user moves the mouse over a portion of the scroll bar display representation, e.g., over the slider control.

Returning to FIG. 4, another event handled by the scroll bar is a mouse down event, which is detected at block 82 and handled by a handle mouse down routine 94. A mouse down event is generated whenever the user depresses a mouse button when the pointer is disposed within the display representation of the scroll bar. A related event is a drag event, which is detected in block 84 and handled by a handle drag routine 96. This event is typically generated whenever the user continues to hold down the mouse button and moves the mouse. The drag event typically follows a mouse down event that occurs when the user initially depresses the mouse button.

Yet another related event is a mouse up event, which is detected in block 86 and handled by a handle mouse up routine 98. This event is generally generated whenever the user releases the mouse button after first depressing the button to generate a mouse down event.

Figure 9:
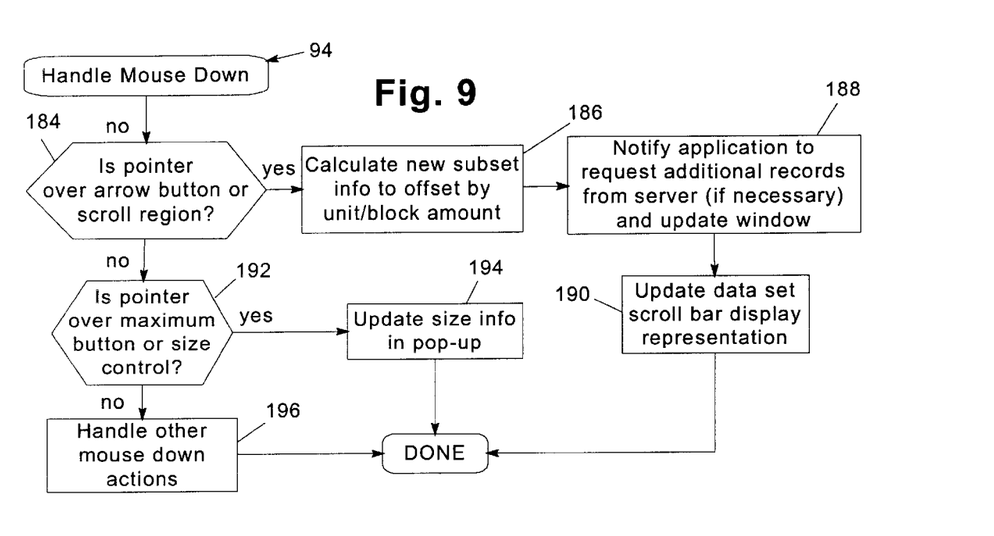
FIG. 9 is a flowchart illustrating the program flow of the handle mouse down routine of FIG. 4.

FIG. 9 illustrates handle mouse down event 94 in greater detail. Routine 94 performs various operations depending upon where upon the display representation of the scroll bar the user has clicked. Block 184, for example, determines whether the pointer is disposed over an arrow button or over the scroll region defined for the display representation of the scroll bar. If so, control passes to block 186 to calculate new subset information to offset the current subset by an appropriate unit or block amount. For example, a scroll bar may be configured such that depression of an arrow button offsets the subset by one or more records. Similarly, user selection of the scroll region may be used to offset the current subset by a block amount, e.g., to select an adjacent subset of different records having the same size as the current subset. In the alternative, the scroll region may not be active, and the arrow buttons may be used to select the next subset adjacent to the current subset instead. It should be appreciated that alternate offsets may also be used in the alternative, as may other control configurations.

Once the new subset information is calculated in block 186, control passes to block 188 to notify the client application to request additional records from the server, if necessary. In addition, the client application will, at this time, update the contents of the window to reflect the new subset. The retrieval of records from a server by a client application is well understood in the art, and need not be discussed further herein.

After the application is notified to request additional records and update the window, control passes to block 190 to update the data set scroll bar display representation to adjust the slider position to reflect the new subset information, in much the same manner as a conventional scroll bar. Routine 94 is then complete.

Returning to block 184, if the pointer is not disposed over an arrow button or scroll region, control passes to block 192 to determine whether the pointer is over a maximum button or size control (which can only occur if an expanded popup is displayed). If so, control passes to block 194 to update the size indication in the popup (both in the size control and the status information) to reflect the proposed new size information. Any additional processing necessary for the particular selected control, known in the art for conventional edit/combo boxes and buttons, may also be performed at this time. Routine 94 is then complete. It should be appreciated that the maximum button will typically present a maximum subset size, to which the current size information is set by this operation. However, actual resizing of the subset in response to mouse button depression over either a size control or maximum button is deferred until the mouse up event occurs, thereby enabling a user to cancel the operation by releasing the mouse button over another area of the display.

Returning to block 192, if the pointer is not disposed on a maximum button or size control, control passes to block 196 to handle other mouse down operations as may be necessary, and as is well known in the art. The routine is then complete. It should be noted that a mouse down on the slider control or a slider resize control initially requires no processing until a drag or mouse up event is received.

Figure 10:
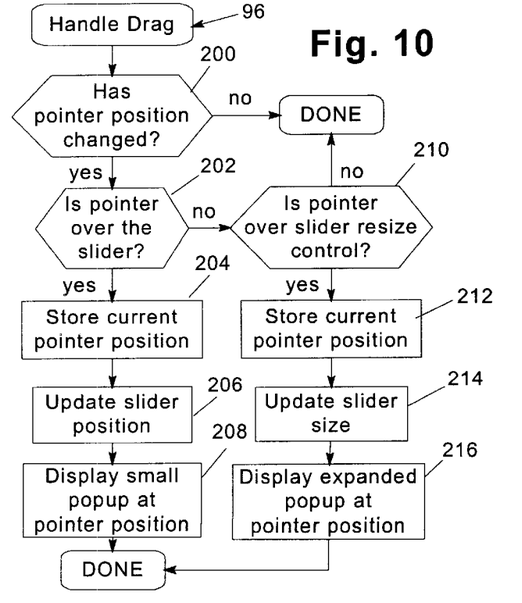
FIG. 10 is a flowchart illustrating the program flow of the handle drag routine of FIG. 4.

Handle drag routine 96 is illustrated in greater detail in FIG. 10. Routine 96 begins in block 200 by determining whether the pointer position has changed. If not, no processing need be performed, and routine 96 terminates. If, however, the pointer position has changed, block 202 is executed to determine whether the pointer is positioned over the slider. If so, control passes to block 204 to store the current pointer position, and then to block 206 to update the slider position to reflect the change in the current pointer position from the last-stored pointer position. Typically, this process involves determining the vertical component of the pointer movement (for a vertically-oriented scroll bar), and adjusting the slider position according to this vertical component. This gives the appearance of the slider being dragged along with movement of the pointer.

Next, in block 208, a small popup (e.g., popup 156 of FIG. 7) is displayed anchored at the new position of the pointer. Moreover, the content of the popup is set to reflect the new range of records forming the current subset. However, in the illustrated embodiment, the actual subset, as well as the contents of the window, are not updated during the drag event to minimize network traffic to the server due to requesting records that may or may not be needed upon completion of the drag operation. Rather, the current subset information is updated in response to the mouse up event, when the user has released the mouse after dragging the slider to the desired location. In the alternative, it may be desirable to dynamically update the subset information as the slider is dragged along the length of the scroll bar display representation. After the popup is displayed, routine 96 is complete.

The new range of records for a subset is determined according to equations 1 and 2 below:

$$\text{New Start Record} = \text{Old Start Record} + \left(\frac{\text{Data Set Size}}{\text{Display Length}}\right) \times \Delta Position \quad (1)$$

$$\text{New End Record} = \text{Old End Record} + \left(\frac{\text{Data Set Size}}{\text{Display Length}}\right) \times \Delta Position \quad (2)$$

where ΔPosition is the vertical component of the change in position of the pointer on the computer display, and the ratio of Data Set Size and Display Length is the scroll rate for the scroll bar.

Returning to block 202, if the pointer is not disposed over the slider, control passes to block 210 to determine whether the pointer is disposed over a slider resize control, oriented along the edge of the slider. If not, routine 96 terminates. If, however, the pointer is disposed over a resize control, control passes to block 212 to store the current pointer position, and then to block 214 to update the slider size— typically be adjusting the appropriate start or end position according to the vertical component of the pointer movement. Next, control passes to block 216 to display an expanded popup (e.g., popup 158 of FIG. 8), anchored at the current position of the pointer. The contents of the popup are selected to display the updated proposed size of the subset. In this instance, however, as only one edge of the slider is updated, the appropriate start record or end record corresponding to that manipulated edge of the slider is adjusted in the popup, rather than adjusting both edges as with a slider control drag operation.

Figure 11:
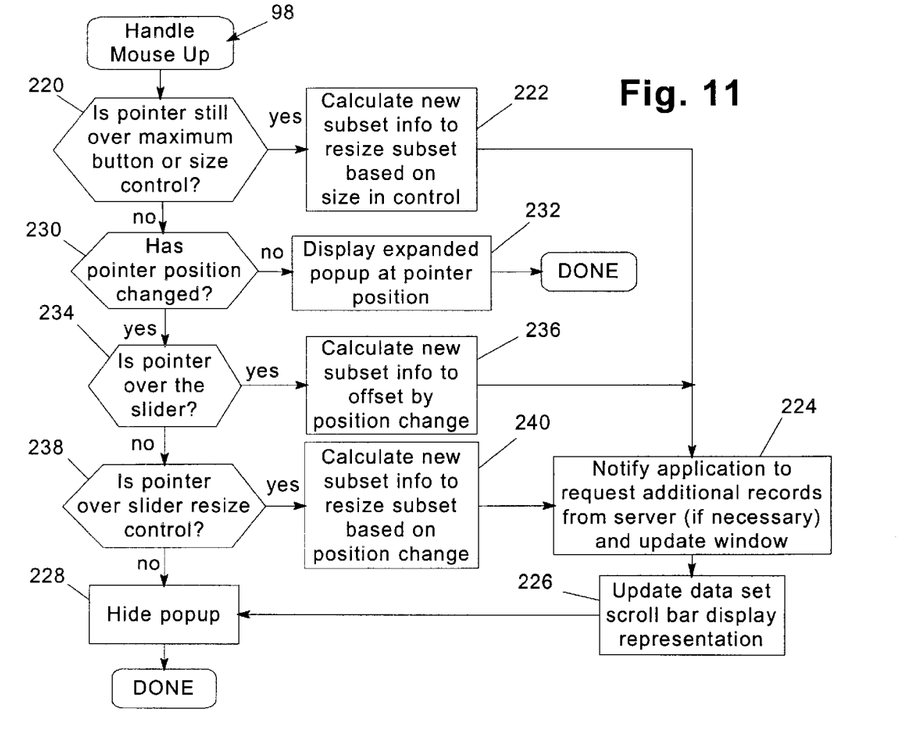
FIG. 11 is a flowchart illustrating the program flow of the handle mouse up routine of FIG. 4.

FIG. 11 illustrates handle mouse up routine 98 in greater detail. First, in block 220, it is determined whether the pointer is still disposed over the maximum button or a size control (if displayed). If so, new subset information is calculated in block 222 to resize the subset based upon the size specified by the maximum button or size control. In addition, the starting and/or ending records for the new subset are determined based upon one or both of equations 1 and 2 above.

Next, control passes to block 224 to notify the client application to request additional records from the server (if necessary) and to update the contents of the window to reflect the new subset. Control then passes to block 226 to update the data set scroll bar display representation to incorporate the new size and/or position of the slider. Next, block 228 hides the popup by removing the popup from the display. Routine 98 is then complete.

Returning to block 220 if the pointer is not still over the maximum button or size control, block 230 determines whether the pointer position has changed. If not, control passes to block 232 to display the expanded popup (e.g., popup 158 of FIG. 8), anchored at the current pointer position. This operation represents a user pointing and clicking on the display representation of the scroll bar. In some implementations, a user may be able to point and click anywhere on the scroll bar. In other implementations, however, it may be desirable to require the user to point and click on the slider control to bring up the expanded popup, whereby an additional step of checking to see if the pointer is over the slider control would be required prior to displaying the popup. Regardless, once the popup is displayed, routine 98 terminates.

Returning to block 230, if the pointer position has changed, control passes to block 234 to determine whether the pointer is disposed over the slider. If it is, control passes to block 236 to calculate new subset information to offset the position of the slider by the total change of position in the pointer since the mouse down event was initiated. In addition, the starting and ending records for the new subset are determined based upon equations 1 and 2 above. Control then passes to blocks 224, 226 and 228 to respectively notify the application to update the window contents with the new subset, update the data set scroll bar display representation, and hide the displayed popup. Routine 98 is then complete.

Returning to block 234, if the pointer is not disposed over the slider, control passes to block 238 to determine whether the pointer is disposed over a slider resize control. If not, control passes to block 228 to hide any popup, whereby routine 98 then terminates. If, however, the pointer is disposed over a slider resize control, control passes to block 240 to calculate the new subset information to resize the subset based upon the position change of the pointer. This is performed, as discussed above, by calculating a new starting or ending record, as appropriate, according to one of equations 1 or 2. Next, control passes to block 224 to notify the application to update the window contents with the new subset, and then to blocks 226 and 228 to update the data set scroll bar display representation and hide the popup. Routine 98 is then complete.

Figure 12:
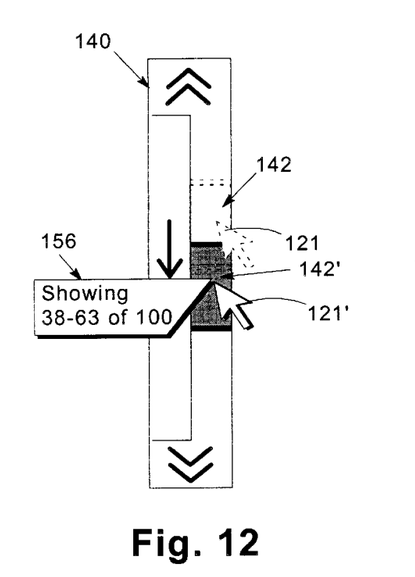
FIG. 12 is a block diagram of the data set scroll bar display representation of FIG. 6, after processing of a slider drag operation by the handle drag and handle mouse up routines of FIGS. 10 and 11.

FIG. 12 illustrates the display representation 140 of a data set scroll bar upon a slider drag operation from an original position, represented at 142, to a new position, illustrated at 142'. The movement of the slider between these two positions is governed by the vertical component of the movement of the pointer from the position illustrated at 121 to the new position at 121'. It should also be noted that popup 156 tracks the movement of the pointer during this operation. In addition, the contents of the popup are also updated to reflect the potential new subset range (here 38–63, from an original subset range of 25–50).

Figure 13:
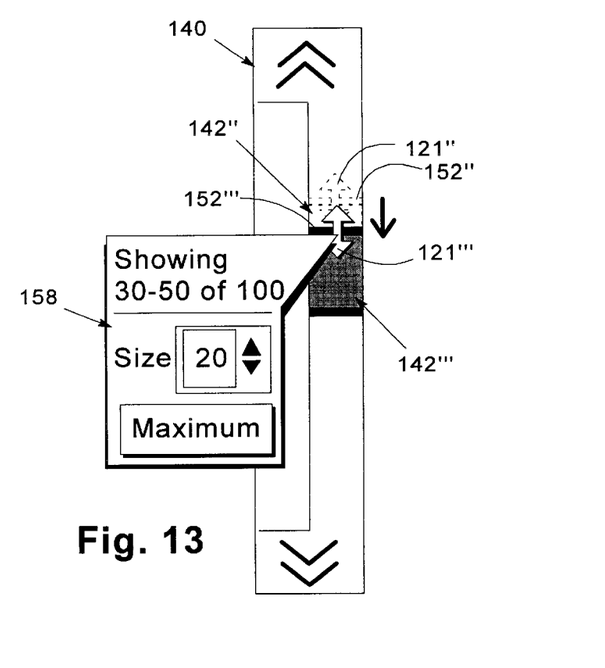
FIG. 13 is a block diagram of the data set scroll bar display representation of FIG. 6, after processing of a slider resize operation by the handle drag and handle mouse up routines of FIGS. 10 and 11.

FIG. 13 illustrates the effects on display representation 140 of a resizing operation directed to a slider resize control 152" on a slider located at 142". As shown in this figure, the pointer initially has a display representation illustrated at 121", where the pointer has shifted to a double arrow icon to indicate that a resizing operation may be performed on the slider. Then, in response to movement of the pointer to the position noted at 121'", the slider control takes the configuration shown at 142'", wherein the slider resize control at the starting edge of the slider control translates to a position shown at 152'". In addition, it is shown that the position of popup 158 tracks the movement of the pointer, and the contents thereof further track the movement of the resize control (here from a starting record of 25 to a starting record of 30). In addition, the current size displayed in the size control box is also updated dynamically.

Figure 14:
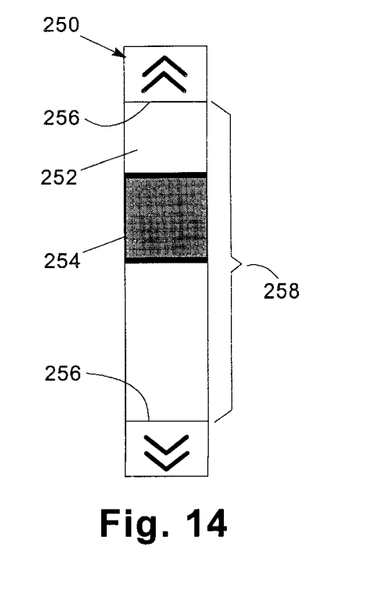
FIG. 14 is a block diagram of an alternate display representation to that shown in FIG. 6.

A data set scroll bar consistent with the invention may have other display representations consistent with the invention. For example, as illustrated in FIG. 14, a display representation 250 omits the bracket that is used to represent the information space, or overall data set, that is covered by the scroll bar. Instead, a scroll bar region is shown at 252, with a slider control 254 disposed across the entire width of the display representation. The scroll region 252, and hence the information space, is delimited by transverse lines 256 which are separated by a length 258 from which the relative length of the subset of data can be determined by comparing the length of slider control 254 to the length 258 between the transverse lines 256. One potential use for such a display representation is when the data set scroll bar is not mated to, and running alongside a conventional scroll bar.

Figure 15:
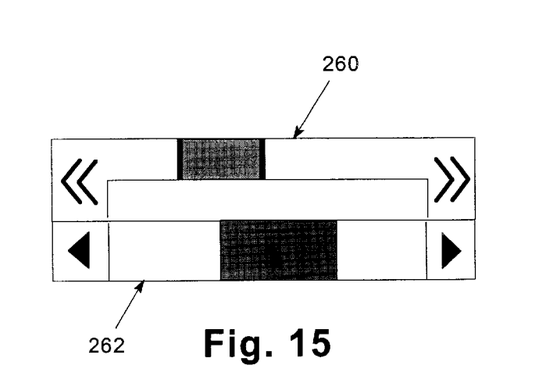
FIG. 15 is a block diagram of another alternate, horizontally-oriented display representation to that shown in FIG. 6, shown alongside a horizontally-oriented scroll bar.

It should also be appreciated that a data set scroll bar consistent with the invention need not be vertically oriented, but rather may be horizontally oriented as shown by display representation 260 of FIG. 15. Moreover, a data set scroll bar consistent with the invention may be oriented adjacent a conventional scroll bar (e.g., scroll bar 262 of FIG. 15), or may be used independently of any separate scroll bar. It should also be appreciated that other user interface operations may also be used to interface with a data set scroll bar consistent with the invention. For example, various keyboard inputs may also be used to direct input to the scroll bar, among other operations.

Various additional modifications may be made consistent with the spirit and scope of the invention. It will be appreciated that other environments, as well as other data organizations, may be used consistent with the invention. For example, it may be desirable, regardless of whether or not a data set is stored locally or externally, to be able to control the amount of a data set that is currently allocated to a particular window. Among other advantages, such an implementation would permit a user to vary the granularity of a scroll bar that controls the viewable content of a window. Thus, for example, if a given subset resulted in excessive window content that required too much scrolling to access information within the subset, a user could change the size of the subset via the data set user interface control such that the window contents were smaller, and thus less scrolling was required to access the information in the current subset.

Also, rather than being implemented as a scroll bar, a data set user interface control may utilize other user interface mechanisms, e.g., toolbar or pallet mechanisms, or other known mechanisms used to search and/or access an information space. It will be appreciated that other modifications may be made to the illustrated embodiments. Therefore, the invention lies in the claims hereinafter appended.

What is claimed is:

1. A computer-implemented method of accessing information, the method comprising:
    (a) transmitting a request from a client computer to a server computer to determine a data set that matches the request;
    (b) receiving, from the server computer, a subset of data from the data set in response to the request;
    (c) displaying, within a window on a computer display coupled to the client computer, at least a portion of the subset of data, wherein the subset of data represents that segment of the data set that is allocated to the window; and
    (d) displaying a data set user interface control on the computer display, the data set user interface control indicating a size of the subset of data relative to an overall size of the data set.

2. The method of claim 1, further comprising:
    (a) receiving data from a second subset of data from the data set;
    (b) updating the window to display at least a portion of the second subset of data; and
    (c) updating the data set user interface control to indicate the size of the second subset of data relative to the overall size of the data set.

3. The method of claim 1, further comprising initiating retrieval of data from a second subset of data in the data set from the server computer in response to user input directed to the data set user interface control.

4. The method of claim 1, wherein the data set user interface control includes a scroll bar display element with a slider display element, wherein the slider display element has a length, relative to that of a scroll region defined on the scroll bar display element, that indicates the size of the subset of data relative to the overall size of the data set.

5. The method of claim 4, wherein the subset of data has lower and upper bounds, and wherein the slider display element has first and second edges positioned respectively along the scroll bar display element to indicate the relative positions of the lower and upper bounds of the subset of data in the data set.

6. The method of claim 5, further comprising:
    (a) adjusting both the lower bound of the subset of data and the size of the subset of data in response to user input directed to a first slider resize control disposed proximate the first edge of the slider display element; and
    (b) adjusting both the upper bound of the subset of data and the size of the subset of data in response to user input directed to a second slider resize control disposed proximate the second edge of the slider display element.

7. The method of claim 5, further comprising adjusting the lower and upper bounds of the subset of data while maintaining the size of the subset of data in response to a user dragging the slider display element along the length of the scroll bar display element.

8. The method of claim 5, further comprising retrieving a second subset of data adjacent to the first subset of data in the data set in response to user input directed to the scroll bar display element.

9. The method of claim 8, wherein retrieving the second subset of data from the data set includes retrieving as the second subset of data an amount of data equivalent in size to the first subset of data.

10. The method of claim 8, wherein the data set user interface control includes at least one button, and wherein retrieving the second subset of data is performed in response to user input directed to the button.

11. The method of claim 8, wherein the data set user interface control includes a scroll region, and wherein retrieving the second subset of data is performed in response to user input directed to the scroll region.

12. The method of claim 8, wherein the data set user interface control includes at least one button, the method further comprising retrieving a second subset of data offset from the first subset of data in the data set in response to user input directed to the button.

13. The method of claim 4, further comprising:
  (a) displaying a second user interface control on the computer display, the second user interface control including a second scroll bar display element and a second slider display element, the second slider display element indicating a relative position of the portion of the subset of data that is displayed in the window; and
  (b) displaying a second portion of the subset of data in the window in response to user input directed to the second user interface control.

14. The method of claim 13, further comprising displaying the first and second scroll bar display elements alongside one another along an edge of the window.

15. The method of claim 14, wherein the data set user interface control includes a bracket display element that visually brackets the second scroll bar display element.

16. A computer-implemented method of accessing information, the method comprising:
  (a) displaying within a window on a computer display at least a portion of a subset of data from a data set, wherein the subset of data represents that segment of the data set that is allocated to the window;
  (b) displaying a data set user interface control on the computer display, the data set user interface control indicating a size of the subset of data relative to an overall size of the data set; and
  (c) displaying at least one parameter of the subset of data in response to user input directed to the data set user interface control.

17. The method of claim 16, wherein displaying at least one parameter includes displaying a popup window in response to user input during positioning of a pointer over the slider display element.

18. The method of claim 17, wherein displaying at least one parameter includes displaying in the popup window a numerical indication of at least one of the lower bound of the subset of data, the upper bound of the subset of data, the size of the subset of data, and the overall size of the data set.

19. The method of claim 18, wherein the data set includes a plurality of records, the subset of data includes a subset of the plurality of records, and the lower and upper bounds respectively define starting and ending records in the subset of the plurality of records, and wherein displaying at least one parameter includes displaying numerical indications of the starting and ending records in the subset of the plurality of records, and the total number of records in the plurality of records.

20. The method of claim 17, further comprising adjusting at least one of the lower bound, the upper bound and the size of the subset of data in response to user input directed to the popup window.

21. The method of claim 20, wherein adjusting at least one of the lower bound, the upper bound and the size of the subset of data includes setting the size of the subset of data to a maximum subset size in response to user input directed to a maximum size user interface control displayed in the popup window.

22. A method of accessing information from a server computer with a client computer, the method comprising:
  (a) determining, in response to a request received by the server computer, a data set including a plurality of records that match the request;
  (b) transmitting a subset of records from the data set to the client computer, the subset of records including starting and ending records;
  (c) displaying a window on a computer display coupled to the client computer;
  (d) displaying at least a portion of the data in the subset of records in the window, wherein the data in the subset of records represents that segment of the data set that is allocated to the window; and
  (e) displaying a data set user interface control on the computer display, the data set user interface control including a scroll bar display element with a slider display element, the slider display element including first and second edges positioned respectively along the scroll bar display element to indicate relative positions of the starting and ending records in the data set.

23. A client apparatus, comprising:
  (a) a memory; and
  (b) a program, resident in the memory, the program configured to transmit a request to a server computer to determine a data set that matches the request, receive from the server computer a subset of data from the data set in response to the request, display within a window on a computer display at least a portion of the subset of data, and to display a data set user interface control on the computer display, the data set user interface control indicating a size of the subset of data relative to an overall size of the data set, wherein the subset of data represents that segment of the data set that is allocated to the window.

24. The apparatus of claim 23, wherein the program is further configured to initiate retrieval of a second subset of data in the data set in response to user input directed to the data set user interface control.

25. The apparatus of claim 23, wherein the data set user interface control includes a scroll bar display element with a slider display element, wherein the slider display element has a length relative to that of the scroll bar display element that indicates the size of the subset of data relative to the overall size of the data set.

26. The apparatus of claim 25, wherein the subset of data has lower and upper bounds, and wherein the slider display element has first and second edges positioned respectively along the scroll bar display element to indicate the relative positions of the lower and upper bounds of the subset of data in the data set.

27. The apparatus of claim 26, wherein the program is further configured to adjust both the lower bound of the subset of data and the size of the subset of data in response to user input directed to a first slider resize control disposed proximate the first edge of the slider display element, and to adjust both the upper bound of the subset of data and the size of the subset of data in response to user input directed to a second slider resize control disposed proximate the second edge of the slider display element.

28. The apparatus of claim 26, wherein the program is further configured to adjust the lower and upper bounds of the subset of data while maintaining the size of the subset of data in response to a user dragging the slider display element along the length of the scroll bar display element.

29. The apparatus of claim 26, wherein the program is further configured to display at least one parameter of the subset of data in a popup window in response to user input during positioning of a pointer over the slider display element.

30. The apparatus of claim 23, wherein the program is further configured to adjust at least one of the lower bound, the upper bound and the size of the subset of data in response to user input directed to the popup window.

31. The apparatus of claim 30, wherein the program is further configured to set the size of the subset of data to a maximum subset size in response to user input directed to a maximum size user interface control displayed in the popup window.

32. The apparatus of claim 25, wherein the program is further configured to display a second user interface control on the computer display, the second user interface control including a second scroll bar display element and a second slider display element, the second slider display element indicating a relative position of the portion of the subset of data that is displayed in the window, and the program further configured to display a second portion of the subset of data in the window in response to user input directed to the second user interface control.

33. The apparatus of claim 32, wherein the program is further configured to display the first and second scroll bar display elements alongside one another along an edge of the window.

34. An apparatus, comprising:
(a) a server computer configured to determine, in response to a request received by the server computer, a plurality of records that match the request, the server computer further configured to transmit a subset of records from the plurality of records, the subset of records including starting and ending records; and
(b) a client computer including a computer display, the client computer configured to receive the subset of records from the server computer, to display a window on the computer display, to display at least a portion of the data in the subset of records in the window, wherein the data in the subset of records represents that segment of the data in the plurality of records that is allocated to the window, and to display a data set user interface control on the computer display, the data set user interface control including a scroll bar display element and a slider display element, the slider display element including first and second edges positioned respectively along the scroll bar display element to indicate relative positions of the starting and ending records in the plurality of records.

35. A program product, comprising:
(a) a program configured to transmit a request from a client computer to a server computer to determine a data set that matches the request, receive from the server computer a subset of data from the data set in response to the request, display within a window on a computer display coupled to the client computer at least a portion of the subset of data, and to display a data set user interface control on the computer display, the data set user interface control indicating a size of the subset of data relative to an overall size of the data set, wherein the subset of data represents that segment of the data set that is allocated to the window; and
(b) a signal bearing media bearing the program.

36. The program product of claim 35, wherein the signal bearing media comprises at least one of a recordable media and a transmission-type media.

37. A user interface control configured to be displayed on a computer display to receive user input for accessing information displayed in a window displayed on the computer display, the window of the type having displayed therein at least a portion of a subset of data from a data set, wherein the subset of data represents that segment of the data set that is allocated to the window, the user interface control comprising:
(a) a scroll bar display element displayed on the computer display, the scroll bar display element including a scroll region; and
(b) a slider display element overlapping the scroll bar display element, the slider display element having a length, relative to that of the scroll region, that indicates the size of the subset of data relative to the overall size of the data set, wherein the user interface control is configured to display at least one parameter of the subset of data in response to user input directed to the data set user interface control.

38. The user interface control of claim 37, wherein the slider display element is configured to initiate display of a portion of a different subset of data from the data set in response to user input directed thereto.

* * * * *